(12) United States Patent
Coban et al.

(10) Patent No.: US 9,247,258 B2
(45) Date of Patent: Jan. 26, 2016

(54) UNIFIED DESIGN FOR PICTURE PARTITIONING SCHEMES

(71) Applicant: Qualcomm Incorporated, San Diego, CA (US)

(72) Inventors: Muhammed Zeyd Coban, Carlsbad, CA (US); Ye-Kui Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 584 days.

(21) Appl. No.: 13/660,635

(22) Filed: Oct. 25, 2012

(65) Prior Publication Data

US 2013/0107952 A1    May 2, 2013

Related U.S. Application Data

(60) Provisional application No. 61/551,862, filed on Oct. 26, 2011.

(51) Int. Cl.
| | |
|---|---|
| H04N 19/174 | (2014.01) |
| H04N 19/105 | (2014.01) |
| H04N 19/70 | (2014.01) |
| H04N 19/172 | (2014.01) |
| H04N 19/46 | (2014.01) |
| H04N 19/61 | (2014.01) |
| H04N 19/11 | (2014.01) |

(52) U.S. Cl.
CPC ........... *H04N 19/174* (2014.11); *H04N 19/105* (2014.11); *H04N 19/11* (2014.11); *H04N 19/172* (2014.11); *H04N 19/46* (2014.11); *H04N 19/61* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 7,627,041 B2 | 12/2009 | Kato | |
| 7,924,921 B2 | 4/2011 | Crinon et al. | |
| 2009/0310686 A1 | 12/2009 | Kee | |
| 2010/0135416 A1* | 6/2010 | Huang | H04N 19/00951 375/240.24 |
| 2010/0189181 A1 | 7/2010 | Zheng et al. | |
| 2011/0206123 A1 | 8/2011 | Panchal et al. | |
| 2012/0014451 A1* | 1/2012 | Lee | H04N 19/436 375/240.16 |
| 2012/0230428 A1* | 9/2012 | Segall | H04N 19/176 375/240.25 |
| 2013/0016771 A1* | 1/2013 | Misra | H04N 19/176 375/240.03 |

(Continued)

FOREIGN PATENT DOCUMENTS

WO    2011013580 A1    2/2011

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.

(Continued)

*Primary Examiner* — William C Vaughn, Jr.
*Assistant Examiner* — Michael J Hess
(74) *Attorney, Agent, or Firm* — Shumaker & Sieffert, P.A.

(57) ABSTRACT

A video coder can control in-picture prediction across slice boundaries within a picture. In one example, a first syntax element can control if in-picture prediction across slice boundaries for slices of a picture. If in-picture prediction across slice boundaries is enabled for the picture, then a second syntax element can control, for an individual slices, if in-picture prediction across slice boundaries is enabled for the slice.

20 Claims, 8 Drawing Sheets

(56) References Cited

U.S. PATENT DOCUMENTS

| | | | | |
|---|---|---|---|---|
| 2013/0070841 | A1* | 3/2013 | Wahadaniah | H04N 19/115 375/240.02 |
| 2013/0235152 | A1* | 9/2013 | Hannuksela | H04N 19/00769 348/43 |
| 2013/0259118 | A1* | 10/2013 | Fu | H04N 19/00066 375/240.02 |

OTHER PUBLICATIONS

Tsai et al., "CE4 Subset3: Slice Common Information Sharing," Document: JCTVC-E045, 5th Meeting, Geneva, CH, Mar. 16-23, 2011, 7 pp.

International Search Report and Written Opinion from International Application No. PCT/US2012/062166, dated Jan. 18, 2013, 14 pp.

Second Written Opinion from International Application No. PCT/US2012/062166, dated Oct. 1, 2013, 8 pp.

Wiegand et al., "WD1: Working Draft 1 of High-Efficiency Video Coding", Joint Collaborative Team on Video Coding, JCTVC-C403, Oct. 7-15, 2010, 137 pp.

Bross et al., "High efficiency video coding (HEVC) text specification draft 6," Joint Collaborative Team on Video Coding, JCTVC-H1003, Nov. 21-30, 2011, 259 pp.

Bross et al., "High efficiency video coding (HEVC) text specification draft 7," Joint Collaborative Team on Video Coding, JCTVC-I1003_D2, Apr. 27-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "WD4: Working Draft 4 of High-Efficiency Video Coding," oint Collaborative Team on Video Coding, JCTVC-F803_d1, Jul. 14-22, 2011.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

Clare et al., "Wavefront and Cabac Flush: Different Degrees of Parallelism Without Transcoding," Joint Collaborative Team on Video Coding, JCTVC-F275 PowerPoint, Jul. 14-22, 2011, 12 slides.

Clare et al., "Wavefront and Cabac Flush: Different Degrees of Parallelism Without Transcoding," Joint Collaborative Team on Video Coding, Document: JCTVC-F275, Jul. 14-22, 2011, 11 pp.

Clare et al., "Wavefront Parallel Processing for HEVC Encoding and Decoding," Joint Collaborative Team on Video Coding, Document: JCTVC-F274, Jul. 14-22, 2011, 16 pp.

Clare et al., "Wavefront Parallel Processing," Joint Collaborative Team on Video Coding, JCTVC-F274 PowerPoint, Jul. 14-22, 2011, 18 slides.

Fuldseth et al., "Tiles," Joint Collaborative Team on Video Coding, JCTVC-F335, Jul. 14-22, 2011, 15 pp.

International Telecommunication Union, "Advanced video coding for generic audiovisual services," Standardization Sector of ITU, Jun. 2011, 674 pp.

Misra et al., "New results for parallel decoding for Tiles," Joint Collaborative Team on Video Coding, JCTVC-F594, Jul. 14-22, 2011, 6 pp.

Misra et al., "New results for parallel decoding for Tiles," Joint Collaborative Team on Video Coding, JCTVC-F594 PowerPoint, Jul. 14-22, 2011, 10 slides.

Wiegand et al., "WD3: Working Draft 3 of High-Efficiency Video Coding," Joint Collaborative Team on Video Coding, JCTVC-E603, Mar. 16-23, 2011, 193 pp.

Wiegand et al., "WD2: Working Draft 2 of High-Efficiency Video Coding", Joint Collaborative Team on Video Coding, JCTVC-D503, Jan. 20-28, 2011, 153 pp.

Zhao et al., "Data Partition for Wavefront Parallelization of H.264 Video Encoder." IEEE International Symposium on Digital Object Identifier, Jul. 2006, 4 pp.

Fuldseth et al., "Tiles," Joint Collaborative Team on Video Coding, JCTVC-F335 PowerPoint, Jul. 14-22, 2011, 12 slides.

\* cited by examiner

UNIFIED DESIGN FOR PICTURE PARTITIONING SCHEMES

This application claims the benefit of U.S. Provisional Application 61/551,862 filed Oct. 26, 2011, the entire content of which is incorporated herein by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into video blocks. Each video block can be further partitioned. Video blocks in an intra-coded (I) frame or slice are encoded using spatial prediction with respect to neighboring video blocks. Video blocks in an inter-coded (P or B) frame or slice may use spatial prediction with respect to neighboring macroblocks or coding units in the same frame or slice or temporal prediction with respect to other reference frames.

SUMMARY

Figure 1:
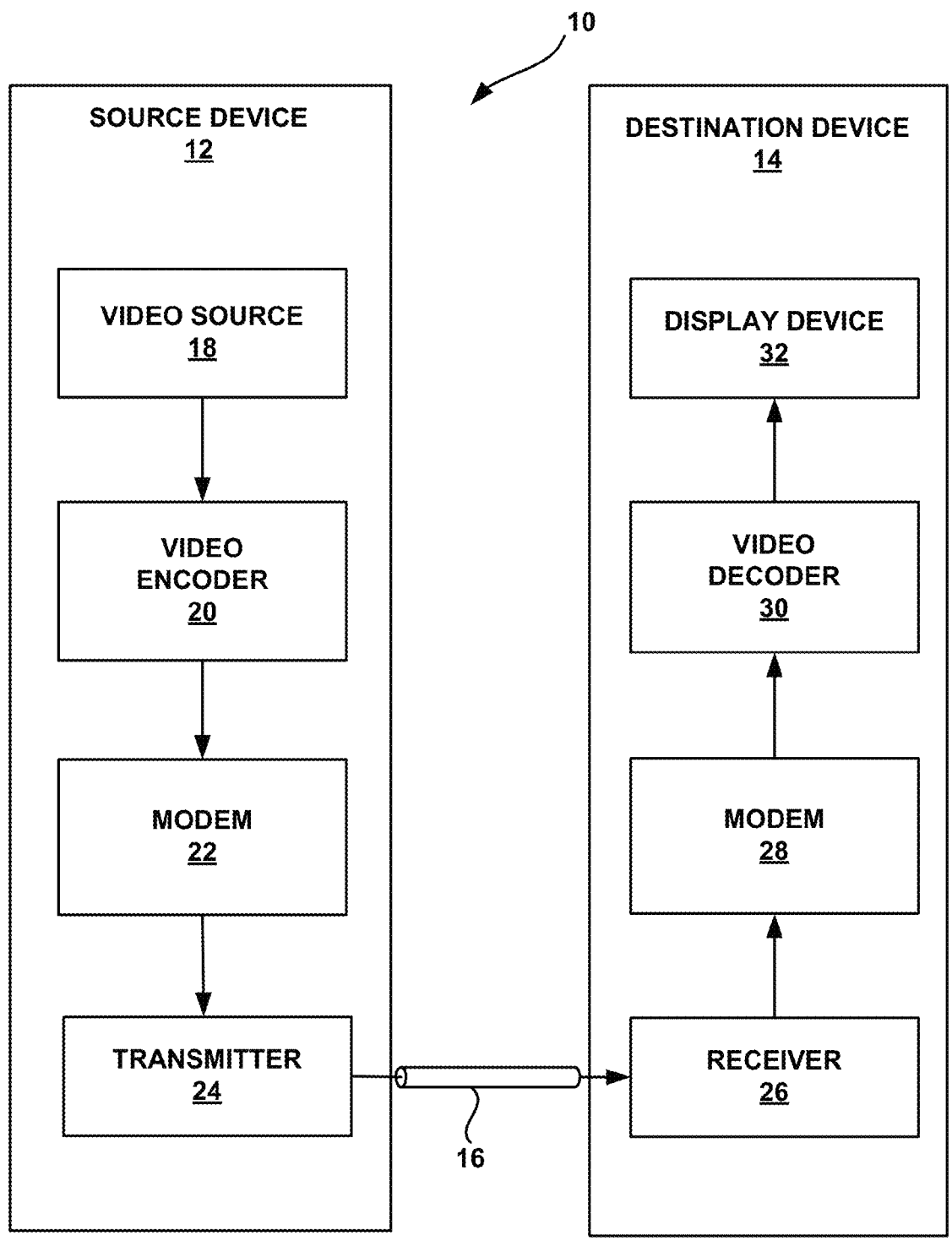
FIG. 1 is a block diagram illustrating an example video encoding and decoding system that may utilize techniques described in this disclosure.

This disclosure describes techniques for controlling in-picture prediction across slice boundaries within a picture. In one example, a first syntax element can control if in-picture prediction across slice boundaries for slices of a picture. If in-picture prediction across slice boundaries is enabled for the picture, then a second syntax element can control, for an individual slices, if in-picture prediction across slice boundaries is enabled for the slice.

In one example, a method of coding video data includes coding a first syntax element for a first picture, wherein a first value for the first syntax element indicates in-picture prediction is allowed across slices for slices of the first picture; and, coding a first coding unit of a first slice based on information of a second coding unit of a second slice.

In another example, a device for coding video data includes a vide coder configured to code a first instance of a first syntax element for a first picture, wherein a first value for the first syntax element indicates in-picture prediction is allowed across slices for slices of the first picture; and, code a first coding unit of a first slice based on information of a second coding unit of a second slice.

In another example, a device for coding video data includes means for coding a first syntax element for a first picture, wherein a first value for the first syntax element indicates in-picture prediction is allowed across slices for slices of the first picture; and means for coding a first coding unit of a first slice based on information of a second coding unit of a second slice.

In another example, a computer-readable storage medium stores instructions that when executed cause one or more processors to code a first syntax element for a first picture, wherein a first value for the first syntax element indicates in-picture prediction is allowed across slices for slices of the first picture; and, code a first coding unit of a first slice based on information of a second coding unit of a second slice.

The details of one or more examples are set forth in the accompanying drawings and the description below. Other features, objects, and advantages will be apparent from the description and drawings, and from the claims.

DETAILED DESCRIPTION

To decode a predicted picture, a video decoder decodes portions of the picture sequentially or decodes multiple portions of the picture in parallel. There may be at least four different picture partitioning schemes to create the portions of the pictures. These partitioning schemes include slices, entropy slices, tiles, and wavefront parallel processing (WPP). Each partitioning scheme may provide certain advantages and disadvantages, such that some partitioning schemes may be more desirable for some coding scenarios, while other partitioning schemes may be more desirable for other coding scenarios. Two or more of the different partitioning schemes may be used together, in some examples.

Decoding a picture often involves in-picture prediction. In-picture prediction generally means that decoding one coding unit (CU) of a picture relies on at least one piece of information related to a second CU of the same picture. In-picture prediction may include intra-prediction where a CU is predicted based on another CU in the same picture. In-picture prediction, however, may also include inter-prediction where a first CU of a first picture is predicted based on a second CU of a different picture. Even though the first CU and second CU are from different pictures, the first CU may still rely on information of another CU in the first picture. As one example, the first CU may be coded using a motion vector predictor that is determined based on a motion vector of another CU in the first picture.

This disclosure will also discuss the concept of allowing in-picture prediction across a slice boundary, across a tile boundary, or across other such boundaries. Generally, in-picture prediction across a slice boundary occurs when a CU of a first slice is predicted using some piece of information determined based on a CU of a second slice that is part of the same picture as the first slice. Similarly, in-picture prediction across a tile boundary occurs when a CU of a first tile is predicted using some piece of information determined based on a CU of a second tile that is part of the same picture as the first tile. As discussed above, in-picture prediction across a slice boundary or across a tile boundary may refer to either intra-prediction or inter-prediction.

Conventionally, slices are independent decoding units that are part of a picture and that include a plurality of CUs. Each of the CUs, within the slice, may be decodable in a raster scan order (e.g. right-to-left and top-to-bottom). Conventionally, CUs within the slices are not predicted across the slice boundary. As will be discussed in greater detail below, however, this disclosure introduces dependent slices, where CUs of a slice may be predicted across slice boundaries.

Entropy slices may be similar to slices. However, CUs within the entropy slices may be predicted across the slice boundary. Entropy slices also conventionally differ from regular slices in their slice header structure. Entropy slices may use a subset of the fields that are present in the regular slice header, while inheriting the missing fields from the main slice header that precedes the entropy slice in decoding order. To indicate that an entropy slice should inherit missing fields from the main slice header, a syntax element, referred to in this disclosure as the lightweight_slice_flag, may be used. For example, when this syntax element is set equal to 1, an entropy slice inherits missing fields from a main slice header.

Tiles may be considered as rectangular regions within a picture, although tiles may also assume other shapes. Slices may either cross tile boundaries, or slices may be restricted to exist only within tiles. To decode tiles, the video decoder may change the order in which it decodes the CUs such that the video decoder decodes the CUs in a raster scan order within the tile. Each tile may include multiple slices. In some instances it may be possible for one slice to cross tile boundaries, in which case a slice may be present in multiple tiles. Moreover, two or more tiles may be processed in parallel, if the two or more tiles are coded independently. Two tiles are considered to be coded independently if decoding one tile does not rely on any information contained in the second tile.

WPP is a technique with which a picture may be divided into "waves" or "wavefronts," which are sets of rows of CUs within a picture. A picture may have R rows of CUs and be partitioned into N waves or wavefronts, such that, for each value X ($0<=X<=N$), the waves having R % N==X belong to the same set (where "%" corresponds to the modulo operator). In this manner, the video decoder may decode each of the set of waves of the picture in parallel. For example, the picture may be divided into rows, and each of the rows may be identified with a wavefront value in an interleave fashion. For instance, the first through third rows may be identified as wavefront values 0 to 2, respectively. The fourth row would then be identified as wavefront value 0, the fifth row would be identified as wavefront value 1, the sixth row would be identified as wavefront value 2, and so forth.

Slice headers may signal entry points for corresponding slices into wavefronts or tiles. For example, a slice header may include addresses that indicate where the slice enters any tile into which the slice crosses. As another example, the slice header may include addresses for wavefronts into which the slice crosses. Slices and entropy slices may be encapsulated within their own respective network abstraction layer (NAL) units. Because slices and entropy slices are encapsulated in their own respective NAL units, the video encoder may not need to signal entry points for the slices or entropy slices in all cases. Accordingly, as described in greater detail below, when slices or entropy slices do not cross tile or wave boundaries, signaling of entry points may be removed, which may result in a bit savings, in accordance with the techniques of this disclosure.

Currently, each of these partition schemes requires a video encoder to signal information differently, so that the video decoder is aware of the particular partitioning scheme that was used at the video encoder side for a picture. As used in this disclosure, a picture generally refers to a unit of video that includes at least one of a slice, an entropy slice, a tile, or a wave, or some combination of slices, entropy slices, tiles, and/or waves. Although a picture can generally be considered to correspond to one full frame of video data, a picture may in some instances include less video data than a full frame. When this disclosure refers to a picture, it can be assumed that the CUs of the picture all correspond to a common temporal instance.

The techniques of this disclosure may be directed to techniques or syntax that can unify at least some of the ways in which to signal information for these different partitioning schemes. For example, the techniques of this disclosure may exploit the similarities between titles and waves to provide such unification. It should be noted that these techniques may not necessarily fully unify the manner in which the video encoder signals information for these different partitioning schemes. However, even some level of unification may result in a reduction of the number of bits that the video encoder needs to signal, and may result in reduction of complexity of the video encoder and video decoder.

In addition to unification, the techniques of this disclosure may address potential limitations in decoding a picture that is predicted using these partitioning schemes. For example, for a current entropy slice, if the parent slice (i.e. the slice from which the entropy slice inherits unsignaled fields) is lost, or another entropy slice, for which in-picture predicting across the two entropy slices is allowed, is lost, then the current entropy slice becomes useless, as there is not sufficient information to decode the entropy slice. As another example, tiles and WPP that are signaled separately may be encapsulated in different slices, and each of these different slices may include a complete slice header. Such signaling of the complete slice header for every tile and WPP may be unnecessary consumption of bandwidth since transmitting the slice header once may be sufficient. There may be other deficiencies such as CABAC initialization parameters that rely upon slice types, where the slice types may not be available in cases where the entropy slice needs to inherit the slice type, thus making it difficult to parse the slice header of such an entropy slice. Furthermore, in current slice header signaling, the starting address for a slice is buried in the slice header; however, convenient access to the starting address may be desirable for a video decoder to detect the start of a new coded picture.

In the techniques of this disclosure, the sequence parameter set (SPS) and the picture parameter set (PPS) syntax elements for a tile may be the same as with current techniques set forth in WD8. For WPP, the syntax element entropy_coding_synchro may be changed to a 1-bit flag that is included in the PPS syntax elements. When the value of entropy_coding_synchro is 0, no specific synchronization process for context variables is invoked. If the value of entropy_coding_synchro is 1, however, then a specific synchronization process for context variables may be invoked. For example, one wavefront substream may be synched from the end of a second largest coding unit (LCU) in a row above. An example of this synchronization is described below.

In addition to the changes to the WPP and tiles PPS syntax elements, this disclosure describes a "short_slice_header_enabled_flag" syntax element and a "dependent_slice_enabled_flag" syntax element, which may be part of the PPS syntax. As will be illustrated below with respect to Table 2 and Table 3, the short_slice_header_enabled_flag in the PPS may indicate the presence of the "slice_id" syntax element and "short_slice_header_flag" syntax element in a slice header. As will also be illustrated below with respect to Table 2 and Table 3, the "dependent_slice_enabled_flag" syntax element in the PPS may indicate the presence of the "slice_boundary_independence_flag" in a slice header. In general, the techniques described in this disclosure change the slice header syntax to support shorter slice headers and to indicate the capability to allow or disallow in-picture prediction across slices for decoding.

The "short_slice_header_flag" syntax element indicates that a slice should inherit missing fields from another slice, or possibly from the PPS or SPS. The "short_slice_header_flag" syntax element may be used regardless of whether the slice, to which this syntax element refers, is a regular slice or an entropy slice. As discussed above, a slice or an entropy slice may form part of or include all or a portion of a tile or a wave.

When the short_slice_header_flag for a slice is true (e.g., has a value of 1), the video decoder determines that this slice includes a short slice header, and all of the missing fields for this short slice header should be inherited from a full slice header, or from the SPS or PPS, or any combination thereof. The full slice header may be the most recent full slice header that precedes the current slice in decoding order.

In accordance with the techniques of this disclosure, the full slice header and the short slice header may be independently parsable. In other words, the short slice header may include sufficient syntax elements to allow the video decoder to inherit the missing fields of the header. For example, the short slice header may include the slice starting address, and also include slice ID, short_slice_header_flag, slice_boundary_independence_flag, CABAC initialization parameters, and a slice quantization parameter (QP). The slice_boundary_independence_flag may be a new flag introduced in the slice header to signal whether in-picture prediction across slices for decoding is allowed (when the value is 0) or disallowed (when the value is 1). In some examples, the slice starting address may be at the beginning of the short slice header, rather than being buried in the header. All other slice header syntax elements may be present only in the full slice headers.

The techniques of this disclosure further describe a tile_boundary_independence_idc syntax element. When this syntax element is equal to 1, the video decoder recognizes that all of the tiles are independently decodable. In other words, to decode one tile, the video decoder does not need to rely on decoding any other tile. As indicated above, one tile may include multiple slices. When the tile_boundary_independence_idc syntax element is 1, it means that none of the slices within the tile can be predicted from any slice that is outside the tile. Also, in some examples, it may be possible for one slice to encompass more than one tile. When the tile_boundary_independence_idc syntax element is 1, it means that no slice within the tile extends beyond the boundary of the tile. Furthermore, when the tile_boundary_independence_idc syntax element is 1, the video decoder may configure itself to decode the tiles in parallel because each tile is independently decodable.

With this design, regular slices (i.e. parent slices), short slices (slices with short slice headers), entropy slices, wavefronts and tiles can be supported in harmony with each other. In this framework, tiles only determine LCU decoding order. When independently decodable tiles are desired, each of them is embedded in an independently decodable slice. Likewise, each WPP wave is encapsulated within an independently decodable slice. No signaling of entry points for tiles or WPP waves is needed, in this case, because the slice does not cross wave or tile boundaries. Entropy slices are supported simply by allowing in-picture prediction for decoding operations by setting slice_boundary_independence_flag equal to 0.

According to techniques of this disclosure, wavefront substreams are ordered based on their starting LCU address such that the wavefront substreams are in the order that a decoder that does not employ parallel decoding can decode the bitstream. In other words, LCU bitstream order is in LCU picture scan order (LCU raster scan), which preserves bitstream causality.

Besides unifying the different picture partitioning schemes, this disclosure may also improve upon other problems mentioned above. For example, according to the techniques of this disclosure, the slice start address is moved forward in the slice header. For another example, the presence of the CABAC initialization parameter, cabac_init_idc, no longer depends on slice_type, which is not present in a short slice header, and thus short slice header itself can be parsed.

FIG. 1 is a block diagram illustrating an example video encoding and decoding system 10 that may utilize techniques for coding syntax data representative of intra-prediction modes for blocks of video data. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless.

The techniques of this disclosure, however, which concern coding of syntax data representative of intra-prediction modes for blocks of video data, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission of encoded video data. Moreover, communication channel 16 is intended to represent just one of many ways in which a video encoding device might transmit data to a video decoding device. For example, in other configurations of system 10, source device 12 might generate encoded video for decoding by destination device 14 and store the encoded video on a storage medium or a file server, such that the encoded video may be accessed by destination device 14 as desired.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for coding syntax data representative of intra-prediction modes for blocks of video data. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for coding syntax data representative of intra-prediction modes for blocks of video data may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to coding syntax data representative of intra-prediction modes for blocks of video data. The information communicated over channel 16 may include syntax information defined by video encoder 20, which is also used by video decoder 30, that includes syntax elements that describe characteristics and/or processing of macroblocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Again, FIG. 1 is merely exemplary and the techniques of this disclosure may apply to video coding settings (e.g., video encoding or video decoding) that do not necessarily include any data communication between the encoding and decoding devices. In other examples, data could be retrieved from a local memory, streamed over a network, or the like. An encoding device may encode and store data to memory, and/or a decoding device may retrieve and decode data from memory. In many cases the encoding and decoding is performed by unrelated devices that don't communicate with one another, but simply encode data to memory and/or retrieve and decode data from memory.

Video encoder 20 and video decoder 30 may operate according to a video compression standard, such as the High Efficiency Video Coding (HEVC) standard presently under development, and may conform to the HEVC Test Model (HM). One draft of the HEVC standard, referred to as "HEVC Working Draft 4" or "WD4" is described in the document "High-Efficiency Video Coding text specification draft 4" by Joint Collaborative Team on Video Coding (JCT-VC) of ITU-T SG16 WP3 and ISO/IEC JTC1/SC29/WG11 6th Meeting: Torino, IT, 14-22 Jul., 2011, which is hereby incorporated by reference in its entirety. A more recent draft of the HEVC standard, referred to as "HEVC Working Draft 8" or "WD8," is described in document JCTVC-J1003, Bross et al., "High efficiency video coding (HEVC) text specification draft 8," Joint Collaborative Team on Video Coding (JCT-VC) of ITU-T SG16 WP3 and ISO/IEC JTC1/SC29/WG11, 10th Meeting: Stockholm, SE 11-20 Jul. 2012, which, as of 17 Oct. 2012, is downloadable from http://phenix.int-evey.fr/jct/doc_end_user/documents/10_Stockholm/wg11/JCTVC-J1003-v8.zip, and which is incorporated herein by reference in its entirety.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a macroblock or a partition of a macroblock. The video blocks may have fixed or varying sizes, and may differ in size according to a specified coding standard. Each video frame may include a plurality of slices. Each slice may include a plurality of macroblocks, which may be arranged into partitions, also referred to as sub-blocks.

As an example, the ITU-T H.264 standard supports intra-prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N. Block sizes that are less than 16×16 may be referred to as partitions of a 16×16 macroblock in ITU-T H.264.

Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" may refer to any independently decodable unit of a video frame such as an entire frame, a slice of a frame, a group of pictures (GOP) also referred to as a sequence, or another independently decodable unit defined according to applicable coding techniques.

As introduced above, efforts are currently in progress to develop a new video coding standard, currently referred to as HEVC. The emerging HEVC standard may also be referred to as H.265. The standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction modes, HM provides as many as thirty-three intra-prediction modes, e.g., based on the size of a block being intra-prediction coded.

HM refers to a block of video data as a coding unit (CU). Syntax data within a bitstream may define a largest coding unit (LCU), which is a largest coding unit in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, a prediction unit (PU), or a transform unit (TU).

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-prediction mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more TUs. Following prediction using a PU, a video encoder may calculate a residual value for the portion of the CU corresponding to the PU. A set of residual values may be transformed, scanned, and quantized to define a set of transform coefficients. The TU defines a data structure that includes the transform coefficients. A TU is not necessarily limited to the size of a PU. Thus, TUs may be larger or smaller than corresponding PUs for the same CU. In some examples, the maximum size of a TU may correspond to the size of the corresponding CU.

Figure 2A:
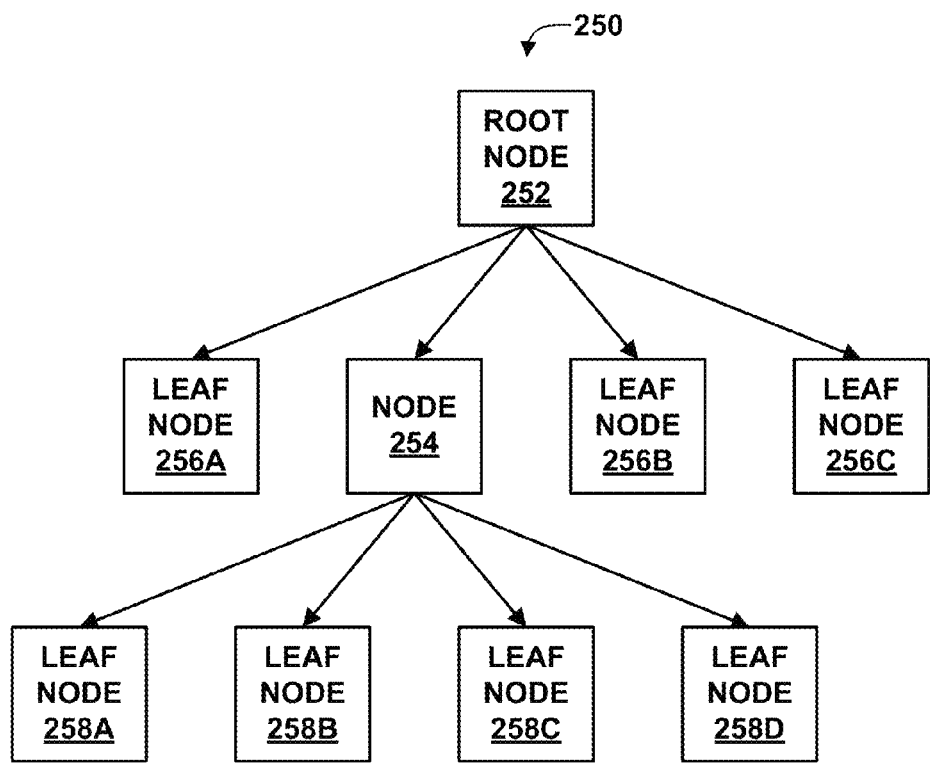
FIGS. 2A and 2B are conceptual diagrams illustrating an example of quadtree partitioning applied to a largest coding unit (LCU).
Figure 2B:
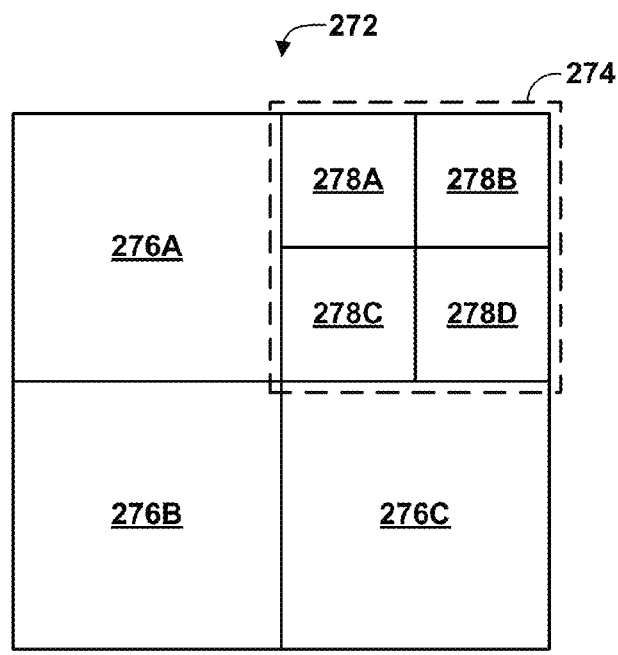

FIGS. 2A and 2B are conceptual diagrams illustrating an example quadtree 250 and a corresponding LCU 272. FIG. 2A depicts an example quadtree 250, which includes nodes arranged in a hierarchical fashion. Each node in a quadtree, such as quadtree 250, may be a leaf node with no children, or have four child nodes. In the example of FIG. 2A, quadtree 250 includes root node 252. Root node 252 has four child nodes, including leaf nodes 256A-256C (leaf nodes 256) and node 254. Because node 254 is not a leaf node, node 254 includes four child nodes, which in this example, are leaf nodes 258A-258D (leaf nodes 258).

Quadtree 250 may include data describing characteristics of a corresponding LCU, such as LCU 272 in this example. For example, quadtree 250, by its structure, may describe splitting of the LCU into sub-CUs. Assume that LCU 272 has a size of 2N×2N. LCU 272, in this example, has four sub-CUs 276A-276C (sub-CUs 276) and 274, each of size N×N. Sub-CU 274 is further split into four sub-CUs 278A-278D (sub-CUs 278), each of size N/2×N/2. The structure of quadtree 250 corresponds to the splitting of LCU 272, in this example. That is, root node 252 corresponds to LCU 272, leaf nodes 256 correspond to sub-CUs 276, node 254 corresponds to sub-CU 274, and leaf nodes 258 correspond to sub-CUs 278.

Data for nodes of quadtree 250 may describe whether the CU corresponding to the node is split. If the CU is split, four additional nodes may be present in quadtree 250. In some examples, a node of a quadtree may be implemented similar to the following pseudocode:

```
quadtree_node {
    boolean split_flag(1);
    // signaling data
    if (split_flag) {
        quadtree_node child1;
        quadtree_node child2;
        quadtree_node child3;
        quadtree_node child4;
    }
}
```

The split flag value may be a one-bit value representative of whether the CU corresponding to the current node is split. If the CU is not split, the split flag value may be '0', while if the CU is split, the split flag value may be '1'. With respect to the example of quadtree 250, an array of split flag values may be 101000000.

In some examples, each of sub-CUs 276 and sub-CUs 278 may be intra-prediction encoded using the same intra-prediction mode. Accordingly, video encoder 122 may provide an indication of the intra-prediction mode in root node 252. Moreover, certain sizes of sub-CUs may have multiple possible transforms for a particular intra-prediction mode. Video encoder 122 may provide an indication of the transform to use for such sub-CUs in root node 252. For example, sub-CUs of size N/2×N/2 may have multiple possible transforms available. Video encoder 122 may signal the transform to use in root node 252. Accordingly, video decoder 128 may determine the transform to apply to sub-CUs 278 based on the intra-prediction mode signaled in root node 252 and the transform signaled in root node 252.

As such, video encoder 122 need not signal transforms to apply to sub-CUs 276 and sub-CUs 278 in leaf nodes 256 and leaf nodes 258, but may instead simply signal an intra-prediction mode and, in some examples, a transform to apply to certain sizes of sub-CUs, in root node 252, in accordance with the techniques of this disclosure. In this manner, these techniques may reduce the overhead cost of signaling transform functions for each sub-CU of an LCU, such as LCU 272.

In some examples, intra-prediction modes for sub-CUs 276 and/or sub-CUs 278 may be different than intra-prediction modes for LCU 272. Video encoder 122 and video decoder 130 may be configured with functions that map an intra-prediction mode signaled at root node 252 to an available intra-prediction mode for sub-CUs 276 and/or sub-CUs 278. The function may provide a many-to-one mapping of intra-prediction modes available for LCU 272 to intra-prediction modes for sub-CUs 276 and/or sub-CUs 278.

In the certain HEVC designs, slices can provide independently decodable units by disabling contexts that depend on coding elements from other slices, such as parsing operations, resetting context-based adaptive binary arithmetic coding (CABAC) states at the beginning of each slice, and disabling in-picture prediction across slice and tile boundaries, including motion vector (MV) prediction, intra mode prediction, pixel prediction, across slices for decoding. A slice generally includes an integer number of CUs.

Entropy slices can provide independently parsable units by disabling usage of context elements across slices and resetting of CABAC states at the beginning of each entropy slice, while allowing in-picture prediction across slices for decoding. Entropy slices can also differ from regular slices in their slice header structure. Entropy slices may, for example, use a subset of the fields that are present in the regular slice header, while inheriting the missing fields from the main slice header that precedes the entropy slice in a decoding order. An entropy slice can be identified by a syntax element in its slice header. For example, an entropy slice may have the slice header syntax element lightweight_slice_flag equal to 1.

Tiles can provide a mechanism to signal the changed decoding order of LCUs. In addition to LCU ordering, tiles can provide independent encoding and decoding capability by disabling in-picture prediction and usage of context elements across tiles.

Tiles generally describe vertical and horizontal boundaries that partition a picture into columns and rows respectively. These boundaries may, for example, break coding dependencies (e.g., dependencies associated with intra prediction, motion vector prediction, parsing, etc.) in the same way as slice boundaries unless otherwise indicated. The regions, such as rectangular regions, resulting from the intersecting column and row boundaries are called tiles (hence the name for the technique as a whole). Each tile can contain an integer number of LCUs. LCUs can be processed in raster scan order within each tile and the tiles themselves can be processed in raster scan order within the picture. Slice boundaries can be introduced by the encoder and need not be coincident with tile boundaries. For example, a tile may contain more than one slice and slices may contain more than one tile. When a slice contains LCUs in more than one tile, the tiles containing the LCUs can be contiguous. Tiles T and T+1 are said to be contiguous if the first LCU in T+1 immediately follows, in transmission order, the last LCU in T. Further, tiles generally allow the column and row boundaries to be specified with and without uniform spacing.

Figure 3:
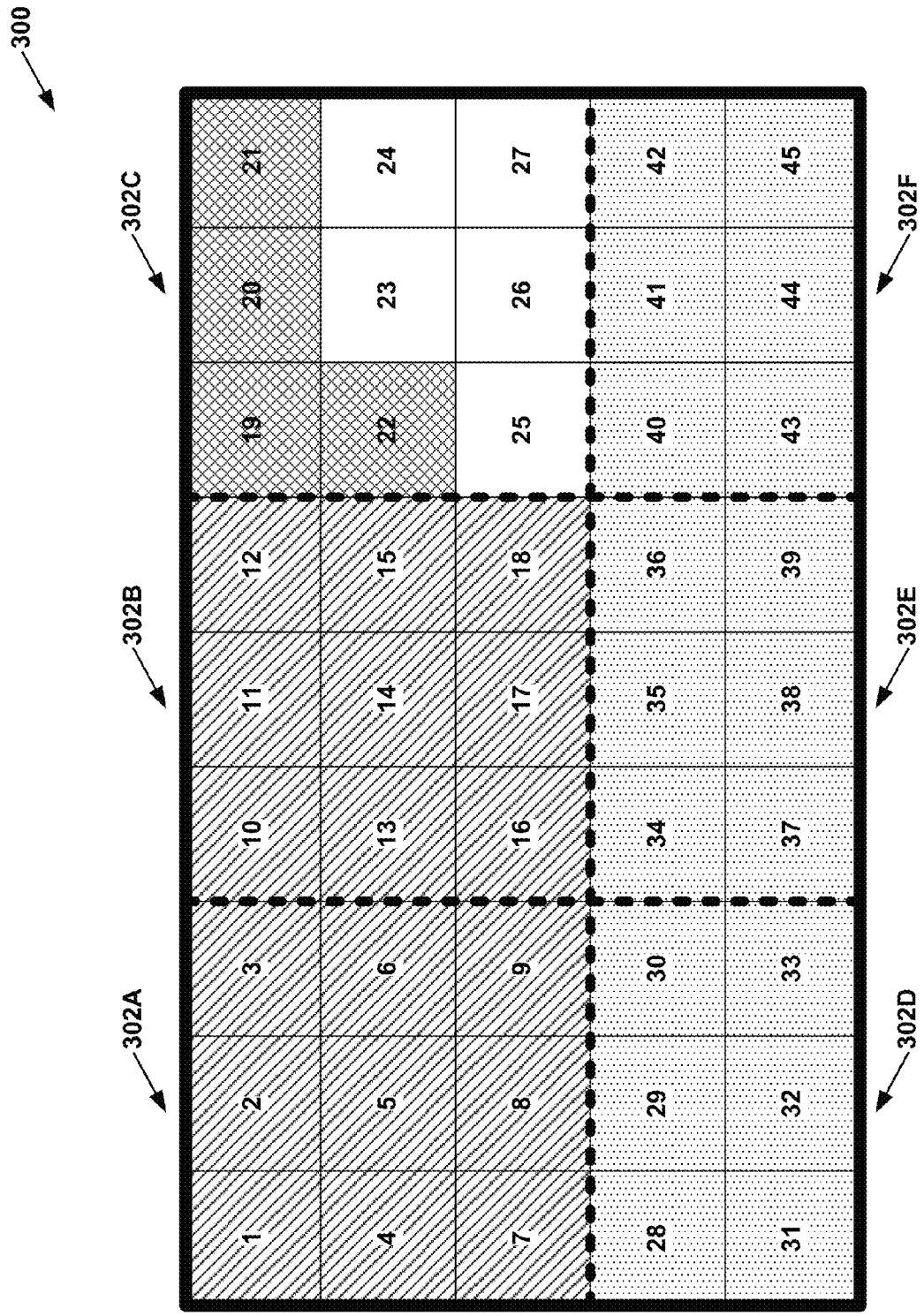
FIG. 3 is a conceptual diagram that illustrates an example coding order when a picture is partitioned into a plurality of tiles.

FIG. 3 is a conceptual diagram that illustrates an example tree block coding order for a picture 300 that is partitioned into multiple tiles 302A, 302B, 302C, 302D, 302E, and 302F (collectively, "tiles 302"). Each square block in picture 300 represents a pixel block associated with a tree block. The thick dashed lines indicate example tile boundaries. Different types of cross-hatching correspond to different slices. The numbers in the pixel blocks indicate positions of the corresponding tree blocks (LCUs) in a tile coding order for picture 300. As illustrated in the example of FIG. 3, tree blocks in tile 302A are coded first, followed by tree blocks in tile 302B, followed by tree blocks in tile 302C, followed by tree blocks in tile 302D, followed by tree blocks in tile 302E, followed by tree blocks in tile 302F. Within each of tiles 302, the tree blocks are coded according to a raster scan order.

Wavefront parallel processing (WPP) can provide multiple sub-streams that can be parsed and decoded in parallel (e.g. semi-independently) without restricting in-picture prediction and usage of context elements across the sub-streams for the waves (rows of LCUs). At the start of each wave, the CABAC states can be initialized based on the CABAC states of the upper row of LCUs after decoding N≥1 LCUs.

Figure 4:
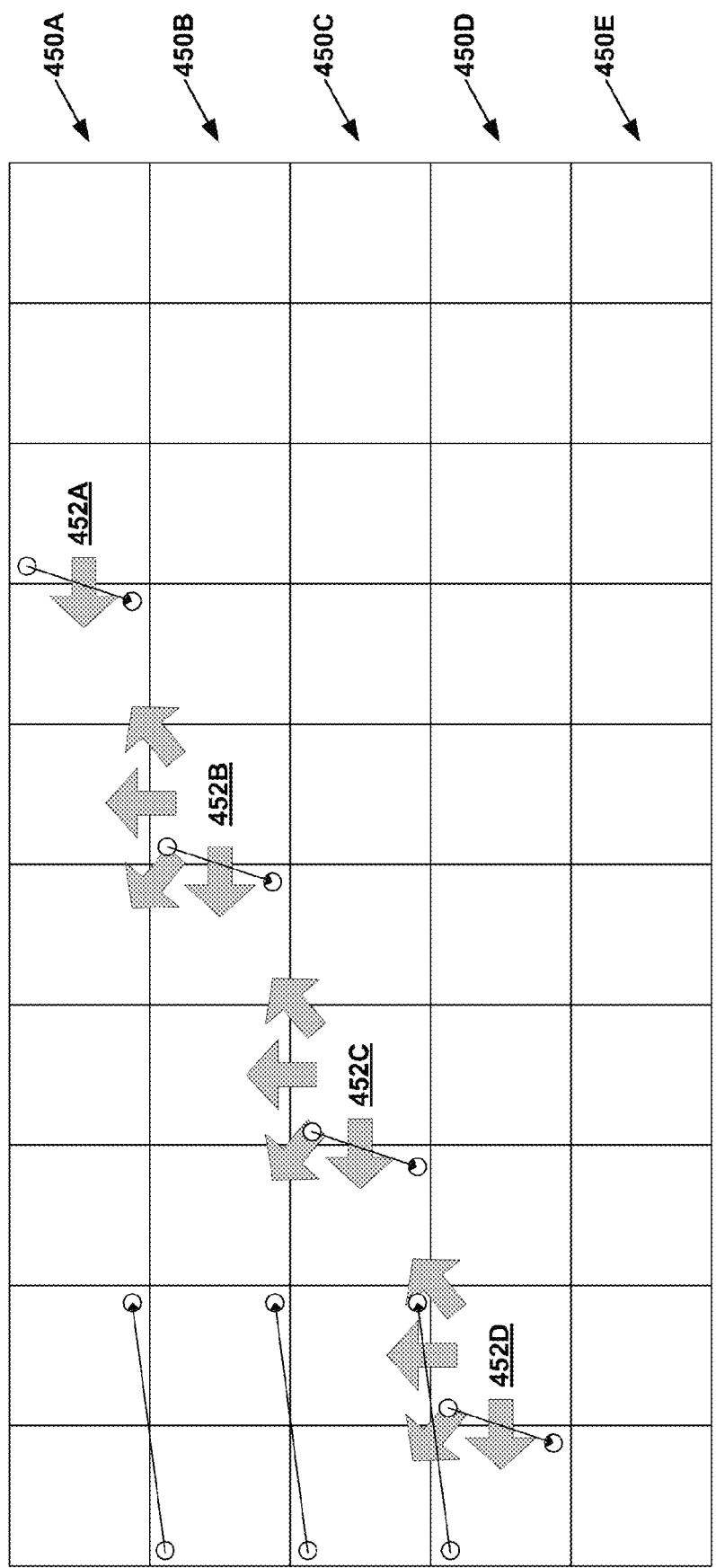
FIG. 4 is a conceptual diagram that illustrates wavefront parallel processing.

FIG. 4 is a conceptual diagram that illustrates wavefront parallel processing. As described above, a picture may be partitioned into pixel blocks, each of which is associated a tree block. FIG. 4 illustrates the pixel blocks associated with the tree blocks as a grid of white squares. The picture includes tree block rows 450A-450E (collectively, "tree block rows 450").

A first thread may be coding tree blocks in tree block row 450A. Concurrently, other threads may be coding tree blocks in tree block rows 450B, 450C, and 450D. In the example of FIG. 4, the first thread is currently coding a tree block 452A, a second thread is currently coding a tree block 452B, a third thread is currently coding a tree block 452C, and a fourth thread is currently coding a tree block 452D. This disclosure may refer to tree blocks 452A, 452B, 452C, and 452D collectively as "current tree blocks 452." Because the video coder may begin coding a tree block row after more than two tree blocks of an immediately higher row have been coded, current tree blocks 452 are horizontally displaced from each other by the widths of two tree blocks.

In the example of FIG. 4, the threads may use data from tree blocks indicated by the thick gray arrows to perform intra prediction or inter prediction for CUs in current tree blocks 452. The threads may also use data from one or more reference frames to perform inter prediction for CUs. To code a given tree block, a thread may select one or more CABAC contexts based on information associated with previously coded tree blocks. The thread may use the one or more CABAC contexts to perform CABAC coding on syntax elements associated with the first CU of the given tree block. If the given tree block is not the leftmost tree block of a row, the thread may select the one or more CABAC contexts based on information associated with a last CU of the tree block to the left of the given tree block. If the given tree block is the leftmost tree block of a row, the thread may select the one or more CABAC contexts based on information associated with a last CU of a tree block that is above and two tree blocks right of the given tree block. The threads may use data from the last CUs of the tree blocks indicated by the thin black arrows to select CABAC contexts for the first CUs of current tree blocks 452.

Slices, entropy slices, tiles, and WPP are all examples of picture partitioning mechanisms for partitioning a picture into different regions and generating coded bits representing the different regions. The coded bits for the different regions for slices and entropy slices can be encapsulated into separate network abstraction layer (NAL) units, and consequently the entry points do not necessarily need to be signaled. The coded bits for different regions for tiles and waves can be encapsulated into the same NAL unit unless being further split into different slices, and entry points in one slice can be signaled in the slice header.

Individual NAL units are often transported in their own packets (i.e. one NAL unit for one packet) during transmission through networks. For an entropy slice, if the associated slice (with a full slice header from which the entropy slice must take the missing slice header syntax elements) is lost, or another entropy slice (for which in-picture prediction across the two entropy slices is allowed) is lost, the entropy slices cannot properly be decoded.

To enable different tiles or waves to be transported separately, the tiles and waves are generally encapsulated into different slices that each include full slice headers. When the transmission environment is error-free, transmitting the same slice header more than once may use unnecessary bits, and thus potentially reduce coding efficiency. Additionally, the presence of a CABAC initialization parameter (e.g. cabac_init_idc) depends on the parameter slice_type, which may not be present in a short slice header, thus potentially making the short slice header incapable of being parsed. Additionally, in current designs the slice starting address can be deeply buried in the slice header, which may hinder convenient access to this parameter for decoders to detect the start of a new coded picture in many application scenarios.

All SPS and picture syntax elements for tiles can be included in the SPS syntax and the PPS syntax. As will be described in more detail below, for WPP, the syntax element entropy_coding_synchro can be a 1-bit flag that is included in the PPS syntax. When this flag is set to true, wavefront substreams can be synched from the end of the second largest coding unit in a row above.

In addition to the above SPS and PPS syntax changes for tiles and WPP, this disclosure introduces two new flags into the PPS syntax. The syntax element "short_slice_header_enabled_flag" controls the presence of the slice header syntax elements slice_id and short_slice_header_flag, and the syntax element "dependent_slice_enabled_flag" controls the presence of the syntax element "slice_boundary_independence_flag." In accordance with the techniques of this disclosure, the slice header syntax is changed to support short slice headers and to have the capability to allow or disallow in-picture prediction across slices for decoding. Short slice headers generally refer to slice headers that are shorter than full slice headers.

The existing lightweight_slice_flag can be replaced with short_slice_header_flag, which signals whether a short slice header is used for the slice. If, for example, the short slice header is used (e.g., when the flag is equal to 1), all other slice header syntax elements and slice header syntax structures that are not included in the short slice header can be inherited from a full slice header, such as the full slice header of the slice that precedes the slice that uses short slice header in the decoding order. All slices having either a full or short slice header, may in some implementation ensure independent parsability of the slice.

This disclosure also introduces a new syntax element (slice_boundary_independence_flag) to the slice header for signaling whether in-picture prediction across slices for decoding is allowed (e.g. when the value is 0) or disallowed (e.g. when the value is 1) for that particular slice. The value of the dependent_slice_enabled_flag in the PPS can determine the presence of the slice_boundary_independence_flag in the slice header. For example, for a picture, the value of dependent_slice_enabled_flag may indicate that in-picture prediction is not allowed across slices of the picture. For such a picture, no slices in the picture are predicted using information found in a different slice of the picture, and accordingly, slice headers for such pictures do not need to include "dependent_slice_enabled_flag" syntax elements.

In other pictures, however, the value of dependent_slice_enabled_flag may indicate that in-picture prediction is allowed across slices of the picture. When dependent_slice_enabled_flag indicates that in-picture prediction is allowed across slices of the picture, slices may include a "slice_boundary_independence_flag in the slice header. The value of slice_boundary_independence_flag in the slice header may indicate whether in-picture prediction across slice boundaries is allowed for the slice. Thus, even if in-picture prediction across boundaries is enabled for slices of picture, in-picture prediction across boundaries may still be disabled for some slices in the picture.

Short slice headers can contain a slice starting address, and may contain a slice ID, short_slice_header_flag, slice_boundary_independency_flag, CABAC initialization parameter, and slice QP. Additional slice header syntax elements and syntax structures may only be present in full slice headers, for example. For a slice with a short slice header, when only independent parsing feature (i.e. the entropy slices feature) is enabled, i.e., when slice_boundary_independency_flag is equal to 0, slice QP is not included. When wavefront parallel processing feature is enabled (i.e., entropy_coding_synchro is equal to 1), a short slice header may, for example, not include the CABAC initialization parameter.

A parent slice may comprise one or more slices (also referred to as child slices) of the same coded picture with the same value of slice_id. Properties of the parent slice along its boundary may override the properties of its child slices. Parent slices can provide independent parsability and decodability, meaning all in-picture prediction across parent slice boundaries may be disallowed. Thus, when a child slice allows in-picture prediction across its slice boundary, the in-picture prediction may only be allowed within the boundaries of its parent slice.

When tile_boundary_independence_idc is equal to 1, it may signal independent decodability of all tiles, in which case each tile can be encoded into one independently decodable slice that has slice_boundary_independence_flag equal to 1. This may provide the capability for a decoder to know in advance to configure itself for possible parallel/independent processing of the tiles. However, tile_boundary_independence_idc may only be an indication, as the in-picture prediction across all tile boundaries is disallowed by the independently decodable slice boundaries.

With this design, regular slices (i.e. parent slices), short slices (slices with short slice headers), entropy slices, wavefronts, and tiles can be supported in harmony with each other. In this framework, tiles may in some instances only determine LCU decoding order. When independently decodable tiles are desired, each of them can be embedded in an independently decodable slice. Each WPP wave can be encapsulated within a slice. No signaling of entry points for tiles or WPP waves may be needed. Entropy slices can be supported simply by allowing in-picture prediction for decoding operations by setting slice_boundary_independence_flag_equal to 0.

Wavefront slices can be ordered based on their starting LCU address. For example, they can be in the order that a decoder that does not employ parallel decoding can decode the bitstream. In other words, LCU processing order may in some instances be solely dependent on tiles.

The techniques of this disclosure may serve to unify some of the different picture partitioning schemes and may improve coding performance. According to the techniques described in this disclosure, the slice start address can be the first syntax element in the slice header. Additionally, the presence of the CABAC initialization parameter (cabac_init_idc) may not need to depend on slice type, which is not present in a short slice header, and thus short slice header itself can be parsed.

Table 1 below shows SPS syntax for tiles in accordance with the techniques of this disclosure. Video encoder 20 represents an example of a video coder configured to generate SPS syntax in accordance with Table 1, and video decoder 30 represents an example of a video decoder configured to parse PPS syntax in accordance with Table 1.

TABLE 1

| seq_parameter_set_rbsp( ) { | Descriptor |
|---|---|
| profile_idc | u(8) |
| reserved_zero_8bits /* equal to 0 */ | u(8) |
| level_idc | u(8) |
| seq_parameter_set_id | ue(v) |
| max_temporal_layers_minus1 | u(3) |
| pic_width_in_luma_samples | u(16) |
| pic_height_in_luma_samples | u(16) |
| num_tile_columns_minus1 | ue(v) |
| num_tile_rows_minus1 | ue(v) |
| if (num_tile_columns_minus1 != 0 \|\| num_tile_rows_minus1 != 0) { | |
|   tile_boundary_independence_idc | u(1) |
|   uniform_spacing_idc | u(1) |
|   if (uniform_spacing_idc != 1) { | |
|     for (i=0; i<num_tile_columns_minus1 ; i++) | |
|       column_width[i] | ue(v) |
|     for (i=0; i <num_tile_rows_minus1; i++) | |
|       row_height[i] | ue(v) |
|   } | |
| } | |
| bit_depth_luma_minus8 | ue(v) |
| bit_depth_chroma_minus8 | ue(v) |
| pcm_bit_depth_luma_minus1 | u(4) |
| pcm_bit_depth_chroma_minus1 | u(4) |
| log2_max_frame_num_minus4 | ue(v) |
| pic_order_cnt_type | ue(v) |
| if( pic_order_cnt_type == 0 ) | |
|   log2_max_pic_order_cnt_lsb_minus4 | ue(v) |
| else if( pic_order_cnt_type == 1 ) { | |
|   delta_pic_order_always_zero_flag | u(1) |
|   offset_for_non_ref_pic | se(v) |
|   num_ref_frames_in_pic_order_cnt_cycle | ue(v) |
|   for( i = 0; i < num_ref_frames_in_pic_order_cnt_cycle; i++ ) | |
|     offset_for_ref_frame[ i ] | se(v) |
| } | |
| max_num_ref_frames | ue(v) |
| gaps_in_frame_num_value_allowed_flag | u(1) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| log2_min_pcm_coding_block_size_minus3 | ue(v) |
| max_transform_hierarchy_depth_inter | ue(v) |
| max_transform_hierarchy_depth_intra | ue(v) |
| chroma_pred_from_luma_enabled_flag | u(1) |
| loop_filter_across_slice_flag | u(1) |
| sample_adaptive_offset_enabled_flag | u(1) |
| adaptive_loop_filter_enabled_flag | u(1) |
| pcm_loop_filter_disable_flag | u(1) |
| cu_qp_delta_enabled_flag | u(1) |
| temporal_id_nesting_flag | u(1) |
| inter_4x4_enabled_flag | u(1) |
| rbsp_trailing_bits( ) | |
| } | |

Table 2 below shows PPS syntax for tiles in accordance with the techniques of this disclosure. Video encoder 20 represents an example of a video coder configured to generate PPS syntax in accordance with Table 2, and video decoder 30 represents an example of a video decoder configured to parse PPS syntax in accordance with Table 2. As can be seen below in Table 2, the "dependent_slice_enabled_flag" syntax element is present in the PPS syntax.

TABLE 2

| pic_parameter_set_rbsp( ) { | Descriptor |
|---|---|
| pic_parameter_set_id | ue(v) |
| seq_parameter_set_id | ue(v) |
| tile_info_present_flag | u(1) |
| if (tile_info_present_flag == 1) { | |

TABLE 2-continued

| pic_parameter_set_rbsp( ) { | Descriptor |
|---|---|
|     num_tile_columns_minus1 | ue(v) |
|     num_tile_rows_minus1 | ue(v) |
|     if (num_tile_columns_minus1 != 0 \|\| num_tile_rows_minus1 != 0) { | |
|         tile_boundary_independence_idc | u(1) |
|         uniform_spacing_idc | u(1) |
|         if (uniform_spacing_idc != 1) { | |
|             for (i=0; i<num_tile_columns_minus1 ; i++) | |
|                 column_width[i] | ue(v) |
|             for (i=0; i <num_tile_rows_minus1; i++) | |
|                 row_height[i] | ue(v) |
|             } | |
|         } | |
|     } | |
|     entropy_coding_mode_flag | u(1) |
|     if(entropy_coding_mode_flag ) | |
|         entropy_coding_synchro | u(1) |
|     num_temporal_layer_switching_point_flags | ue(v) |
|     for( i = 0; i < num_temporal_layer_switching_point_flags; i++ ) | |
|         temporal_layer_switching_point_flag[ i ] | u(1) |
|     num_ref_idx_l0_default_active_minus1 | ue(v) |
|     num_ref_idx_l1_default_active_minus1 | ue(v) |
|     pic_init_qp_minus26 /* relative to 26 */ | se(v) |
|     constrained_intra_pred_flag | u(1) |
|     slice_granularity | u(2) |
|     short_slice_header_enabled_flag | u(1) |
|     dependent_slice_enabled_flag | u(1) |
|     shared_pps_info_enabled_flag | u(1) |
|     if( shared_pps_info_enabled_flag ) | |
|         if( adaptive_loop_filter_enabled_flag ) | |
|             alf_param( ) | |
|     if( cu_qp_delta_enabled_flag ) | |
|         max_cu_qp_delta_depth | u(4) |
|     rbsp_trailing_bits( ) | |
| } | |

For WPP, the syntax element "entropy_coding_synchro" can be a 1-bit flag included in the PPS syntax. The syntax element "entropy_coding_synchro" can specify whether a specific synchronization process for context variables is invoked. For example, if "entropy_coding_synchro" is set to one, the specific synchronization process for context variables may be invoked. The syntax element entropy_coding_synchro may also specify whether a specific memorization process for context variables is invoked prior to the decoding of a CU where x0 is equal to (1<<log 2MaxCUSize) *(entropy_coding_synchro) and y0% (1<<log 2MaxCUSize) is equal to 0.

Additionally, two flags short_slice_header_enabled_flag and dependent_slice_enabled_flag) can be added to the PPS syntax. These two flags can specify the presence of the syntax elements slice_id, short_slice_header_flag, and slice_boundary_independence_flag in the slice headers. If, for example, the short_slice_header_enabled_flag or dependent_slice_enabled_flag is equal to 1, then the slice_id syntax element may be present in the slice header. Otherwise, the slice_id syntax element may not be present in the slice header. Additionally, if, for example, the short_slice_header_enabled_flag is equal to 1, then the short_slice_header_flag may be present in the slice header. Otherwise, the short_slice_header_flag may not be present in the slice header. Additionally, if the dependent_slice_enabled_flag is equal to 1, then the slice_boundary_independence_flag may be present in the slice header. Otherwise, the slice_boundary_independence_flag may not be present in the slice header.

Table 3 below shows slice header syntax in accordance with the techniques of this disclosure. Video encoder 20 represents an example of a video coder configured to generate slice header syntax in accordance with Table 3, and video decoder 30 represents an example of a video decoder configured to parse slice header syntax in accordance with Table 3. As can be seen below in Table 3, the "slice_boundary_independence_flag" syntax element is present in the slice header and is dependent on the "dependent_slice_enabled_flag" syntax element. Additionally, as can be seen by Table 3 below, the syntax element "slice_address" is located at the beginning of the slice header syntax and is located before the "dependent_slice_enabled_flag" syntax element.

TABLE 3

| slice_header( ) { | Descriptor |
|---|---|
|     slice_address | u(v) |
|     if( short_slice_header_enabled_flag \|\| dependent_slice_enabled_flag ) | |
|         slice_id | ue(v) |
|     if( short_slice_header_enabled_flag ) | |
|         short_slice_header_flag | u(1) |
|     if( dependent_slice_enabled_flag ) | |
|         slice_boundary_independence_flag | u(1) |
|     if( !short_slice_header_flag ) { | |
|         slice_type | ue(v) |
|         pic_parameter_set_id | ue(v) |
|         frame_num | u(v) |
|         if( IdrPicFlag ) | |
|             idr_pic_id | ue(v) |
|         if( pic_order_cnt_type == 0 ) | |
|             pic_order_cnt_lsb /* | u(v) |
|         if( slice_type == P \|\| slice_type == B ) { | |
|             num_ref_idx_active_override_flag | u(1) |
|             if( num_ref_idx_active_override_flag ) { | |
|                 num_ref_idx_l0_active_minus1 | ue(v) |
|                 if( slice_type == B ) | |
|                     num_ref_idx_l1_active_minus1 | ue(v) |
|             } | |
|         } | |
|         ref_pic_list_modification( ) | |
|         ref_pic_list_combination( ) | |
|         if( nal_ref_idc != 0 ) | |
|             dec_ref_pic_marking( ) | |
|     } | |
|     if( entropy_coding_mode_flag && !( short_slice_header_flag && entropy_coding_synchro ) ) | |
|         cabac_init_idc | ue(v) |
|     if( !short_slice_header_flag \|\| slice_boundary_independence_flag ) { | |
|         slice_qp_delta | se(v) |
|         if( !short_slice_header_flag ) { | |
|             if( sample_adaptive_offset_enabled_flag ) | |
|                 sao_param( ) | |
|             if( deblocking_filter_control_present_flag ) { | |
|                 disable_deblocking_filter_idc | |
|                 if( disable_deblocking_filter_idc != 1 ) { | |
|                     slice_alpha_c0_offset_div2 | |
|                     slice_beta_offset_div2 | |
|                 } | |
|             } | |
|             if( slice_type == B ) | |
|                 collocated_from_l0_flag | u(1) |
|             if( adaptive_loop_filter_enabled_flag ) { | |
|                 if( !shared_pps_info_enabled_flag ) | |
|                     alf_param( ) | |
|                 alf_cu_control_param( ) | |
|             } | |
|         } | |
|     } | |
| } | |

The syntax element "parameter slice_id" can identify the parent slice associated with the slice. Each parent slice can have a unique slice_id value within the set of parent slices of the coded picture. If not present, the value of slice_id can be unspecified. A parent slice can consist of one or more slices of the same coded picture with the same value of slice_id. A slice with short_slice_header_flag equal to 0 and slice_boundary_independency_flag equal to 1 can be a parent slice by itself. If present, the value of the slice_id of a parent slice may be different than the slice_id of another parent slice of the same coded picture. For all slices belonging to one parent slice, each of the slice header syntax elements and slice header syntax structures that are not present when short_slice_header_flag is equal to 1 may be identical.

If all slices of one parent slice of a picture have short_slice_header_flag equal to 1, each of the slice header syntax elements and slice header syntax structures that are not present when the syntax element "short_slice_header_flag" is set to 1 can be identical for all slices of the picture.

If the parameter short_slice_header_flag is set to 1, then it may specify that a short slice header for which only a subset of slice header syntax elements is present and no slice header syntax structure is present. The value 0 may specify that all slice header syntax elements and slice header syntax structures are present. When not present, the value of short_slice_header_flag can be inferred to be equal to 0.

For one coded picture, there can be at least one slice that has short_slice_header_flag equal to 0. If the parameter_slice_boundary_independence_flag is equal to 1, then it may indicate that all neighboring treeblocks not contained within the same slice as the treeblock being decoded are marked as not available, and the initialization process for the entropy decoder is invoked when decoding the first treeblock in the slice. If the parameter slice_boundary_independence_flag is equal to 0, it may indicate that availability of treeblocks is not affected by the boundaries of this slice. When not present, the parameter slice_boundary_independence_flag can be inferred to be equal to 1. In an alternative example, all instances of "treeblock" described in the above semantics of slice_boundary_independence_flag can be replaced with "coded block".

In some examples, if the parameter entropy_coding_synchro is equal to 1, then one or more of the following may be applied:
  Short slice headers do not contain a slice starting address, and the slice starting address is derived. The first slice has slice starting address equal to 0. The second slice has a slice starting address equal to the number of LCUs in one LCU row. The second slice has a slice starting address equal to two times the number of LCUs in one LCU row, and so on.
  Short slice headers do not contain a slice ID, and slice ID values are derived by increasing by one for each slice that has a full slice header in decoding order.
  Short slice headers do not contain slice_boundary_independency_flag, and the value is inferred to be equal to 1.

The following describes an example derivation process for the availability of treeblock addresses. The input to this process can be a treeblock address tbAddr. The output of this process can be the availability of the treeblock tbAddr. The meaning of availability can be determined when the process is invoked. The treeblock can be marked as available, unless one of the following conditions is true in which case the treeblock can be marked as not available:
  tbAddr<0
  tbAddr>CurrTbAddr
  the treeblock with address tbAddr belongs to a different parent slice than the treeblock with address CurrTbAddr
  the treeblock with address tbAddr belongs to a different slice, and the slice containing the treeblock with address CurrTbAddr has slice_boundary_independence_flag equal to 1.

In some examples, all instances of "treeblock" in the above described derivation process for the availability of treeblock address, including the title, may be replaced with "coded block".

Referring back to FIG. 1, video encoder 20 may encode certain blocks of video data using intra-prediction mode encoding, and provide information indicating a selected intra-prediction mode used to encode the block. Video encoder 20 may intra-prediction encode blocks of any type of frame or slice using an intra-prediction mode, e.g., I-frames or I-slices, in addition to P-frames or P-slices and B-frames or B-slices. When video encoder 20 determines that a block should be intra-prediction mode encoded, video encoder 20 may perform a rate-distortion analysis to select a most appropriate intra-prediction mode. For example, video encoder 20 may calculate rate-distortion values for one or more intra-prediction modes, and select one of the modes having acceptable rate-distortion characteristics.

Video encoder 20 may also be configured to determine an encoding context for the block. The context may include various characteristics of the block such as, for example, a size of the block, which may be determined in terms of pixel dimensions, prediction unit (PU) type such as, in the example of HEVC, 2N×2N, N×2N, 2N×N, N×N, short-distance intra-prediction (SDIP) types such as 2N×N/2, N/2×2N, 2N×1, 1×2N, a macroblock type in the example of H.264, a CU depth for the block, or other measurements of size for a block of video data. In some examples, the context may correspond to how any or all of intra-prediction modes for an above-neighboring block, a left-neighboring block, an above-left neighboring block, an above-right neighboring block, or other neighboring blocks. In some examples, the context may include both intra-prediction modes for one or more blocks as well as size information for the current block being encoded.

In any case, video encoder 20 may include configuration data that maps the context for the block to various coding characteristics for the current block. For example, based on the context for the block, the configuration data may indicate one or more most probable intra-prediction modes. Video encoder 20 may, in some examples, be configured to begin analysis for selection of an intra-prediction mode with the most probable mode, based on the context. When the most probable mode achieves suitable rate-distortion characteristics, in some examples, video encoder 20 may select the most probable mode. In other examples, video encoder 20 need not begin the selection process with the most probable mode.

Following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, maximum macroblock size for a coded unit (such as a frame, slice, macroblock, or sequence), or the like.

Video decoder 30 may ultimately receive encoded video data, e.g., from modem 28 and receiver 26. In accordance with the techniques of this disclosure, video decoder 30 may receive encoded data representative of an intra-prediction mode used to encode a block of video data. Video decoder 30 may be configured to determine a coding context for the block in a manner substantially similar to video encoder 20. Moreover, video decoder 30 may include similar configuration data to video encoder 20, e.g., indications of a most probable mode, an intra-prediction mode index table, and a VLC table for each coding context, etc.

Video encoder 20 and video decoder 30 can use the one or more interpolation filtering techniques described in this disclosure during motion compensation. Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 5:
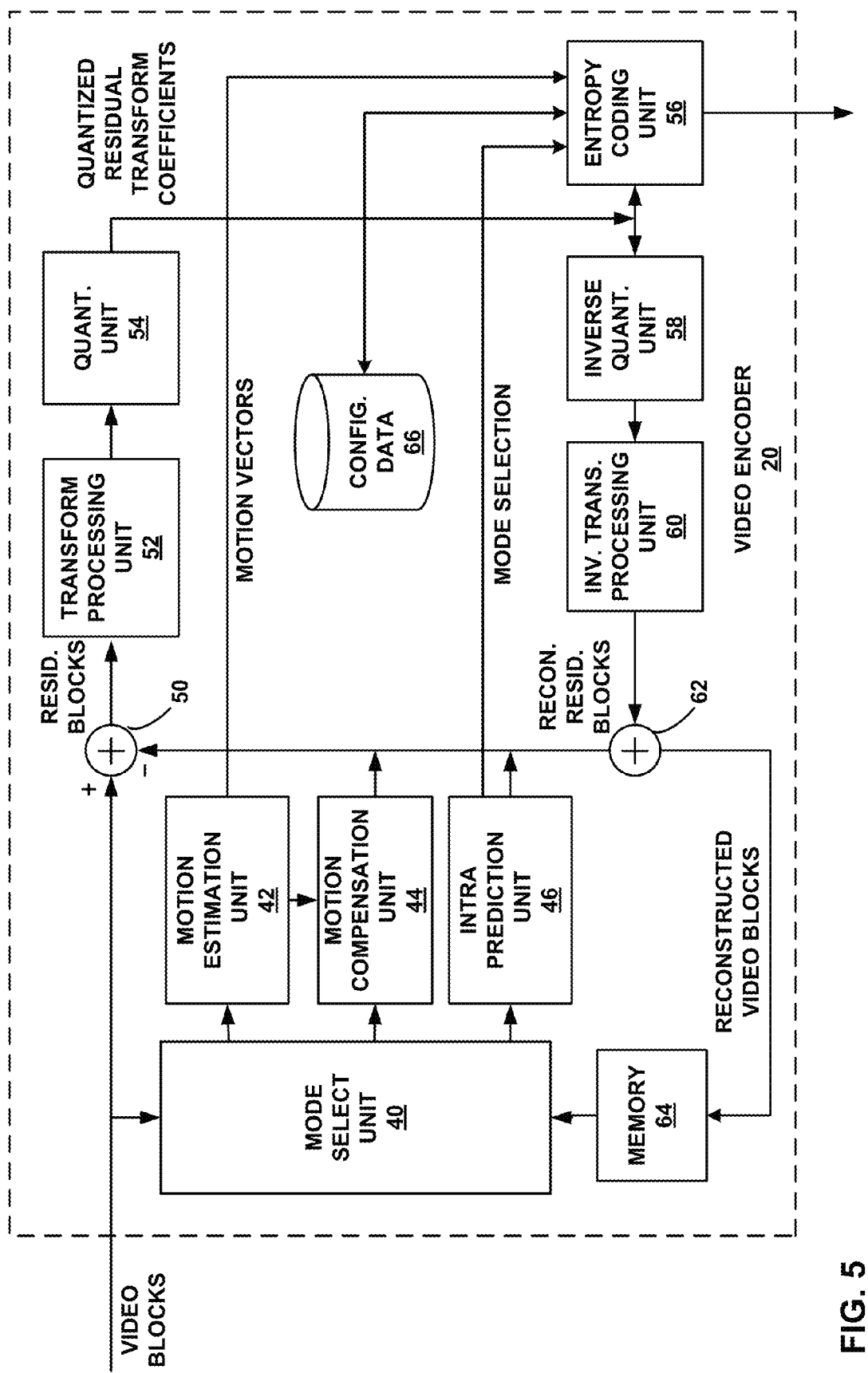
FIG. 5 is a block diagram illustrating an example of a video encoder that may implement techniques described in this disclosure.

FIG. 5 is a block diagram illustrating an example of video encoder 20. Video encoder 20 is an example of a video encoder configured to generate syntax elements conforming to Table 1, Table 2, and Table 3 above. Video encoder 20 may perform intra- and inter-coding of blocks within video frames, including macroblocks, or partitions or sub-partitions of macroblocks. Intra-coding relies on spatial prediction to reduce or remove spatial redundancy in video within a given video frame. Inter-coding relies on temporal prediction to reduce or remove temporal redundancy in video within adjacent frames of a video sequence. Intra-prediction mode (I-mode) may refer to any of several spatial based compression modes and inter-modes such as uni-directional prediction (P-mode) or bi-directional prediction (B-mode) may refer to any of several temporal-based compression modes. Although components for inter-mode encoding are depicted in FIG. 5, it should be understood that video encoder 20 may further include components for intra-prediction mode encoding. However, such components are not illustrated for the sake of brevity and clarity.

As shown in FIG. 5, video encoder 20 receives a current video block within a video frame to be encoded. In the example of FIG. 5, video encoder 20 includes motion compensation unit 44, motion estimation unit 42, memory 64, summer 50, transform processing unit 52, quantization unit 54, and entropy coding unit 56. For video block reconstruction, video encoder 20 also includes inverse quantization unit 58, inverse transform processing unit 60, and summer 62. A deblocking filter (not shown in FIG. 5) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra-prediction unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error results and based on a frame or slice type for the frame or slice including a current block being coded, and provides the resulting intra- or inter-coded block to summer 50 to generate residual block data and to summer 62 to reconstruct the encoded block for use in a reference frame or reference slice. In general, intra-prediction involves predicting a current block relative to neighboring, previously coded blocks, while inter-prediction involves motion estimation and motion compensation to temporally predict the current block.

Motion estimation unit 42 and motion compensation unit 44 represent the inter-prediction elements of video encoder 20. Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in reference frame store 64. Motion compensation unit 44 may also interpolate sub-integer pixels of the reference frame, e.g., an I-frame or a P-frame. The ITU H.264 standard, as an example, describes two lists: list 0, which includes reference frames having a display order earlier than a current frame being encoded, and list 1, which includes reference frames having a display order later than the current frame being encoded. Therefore, data stored in reference frame store 64 may be organized according to these lists.

Motion estimation unit 42 compares blocks of one or more reference frames from reference frame store 64 to a block to be encoded of a current frame, e.g., a P-frame or a B-frame. When the reference frames in reference frame store 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in reference frame store 64 if no values for sub-integer pixel positions are stored in reference frame store 64. Motion estimation unit 42 sends the calculated motion vector to entropy coding unit 56 and motion compensation unit 44. The reference frame block identified by a motion vector may be referred to as a predictive block. Motion compensation unit 44 may calculate prediction data based on the inter-predictive block.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes. For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block. In any case, after selecting an intra-prediction mode for a block, intra-prediction unit 46 may provide information indicative of the selected intra-prediction mode for the block to entropy coding unit 56. Entropy coding unit 56 may encode the information indicating the selected intra-prediction mode in accordance with the techniques of this disclosure.

After predicting a current block, e.g., using intra-prediction or inter-prediction, video encoder 20 may form a residual video block by subtracting the prediction data calculated by motion compensation unit 44 or intra-prediction unit 46 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms, such as those defined by the H.264 standard, which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding, context may be based on neighboring blocks and/or block sizes.

In some cases, entropy coding unit 56 or another unit of video encoder 20 may be configured to perform other coding functions, in addition to entropy coding and coding of the intra-prediction mode as described above. For example, entropy coding unit 56 may be configured to determine coded block pattern (CBP) values for the blocks and partitions. Also, in some cases, entropy coding unit 56 may perform run length coding of the coefficients in a macroblock or partition thereof. In particular, entropy coding unit 56 may apply a zig-zag scan or other scan pattern to scan the transform coefficients in a macroblock or partition and encode runs of zeros for further compression. Entropy coding unit 56 also may construct header information with appropriate syntax elements for transmission in the encoded video bitstream.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame store 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame store 64. The reconstructed video block may be used by motion estimation unit 42 and motion compensation unit 44 as a reference block to inter-code a block in a subsequent video frame.

Video encoder 20 may perform motion estimation with fractional pixel (or sub-pixel) precision. When video encoder 20 uses fractional pixel motion estimation, video encoder 20 may generate data at sub-pixel resolution (e.g., sub-pixel or fractional pixel values) using interpolation operations described in this disclosure. In other words, the interpolation operations are used to compute values at positions between the integer pixel positions. Sub-pixel positions located half the distance between integer-pixel positions may be referred to as half-pixel (half-pel) positions, sub-pixel positions located half the distance between an integer-pixel position and a half-pixel position may be referred to as quarter-pixel (quarter-pel) positions, sub-pixel positions located half the distance between an integer-pixel position (or half-pixel position) and a quarter-pixel position are referred to as eighth-pixel (eighth-pel) positions, and the like.

Video encoder 20 represents an example of a video encoder configured to generate syntax in accordance with Table 1, Table 2, and Table 3 above. For example, video encoder 20 represents an example of a video encoder configured to code a first instance of a first syntax element for a first picture. The first syntax element can be part of a PPS. The first value for the first syntax element can indicate in-picture prediction is allowed across slices for slices of the first picture. When in-picture prediction is allowed across slice boundaries, video encoder 20 can code a first coding unit of a first slice based on information of a second coding unit of a second slice. In response to the first syntax element indicating in-picture prediction is allowed across slices, video encoder 20 can code a second syntax element indicating in-picture prediction is allowed across slices. The second syntax element can be part of a slice header, and the presence of the second syntax element in the slice header can be dependent on the first value of the first syntax element. Video encoder 20 can also code a second instance of the first syntax element for a second picture. The second value for the first syntax element can indicate in-picture prediction is not allowed across slices for slices of the second picture.

Figure 6:
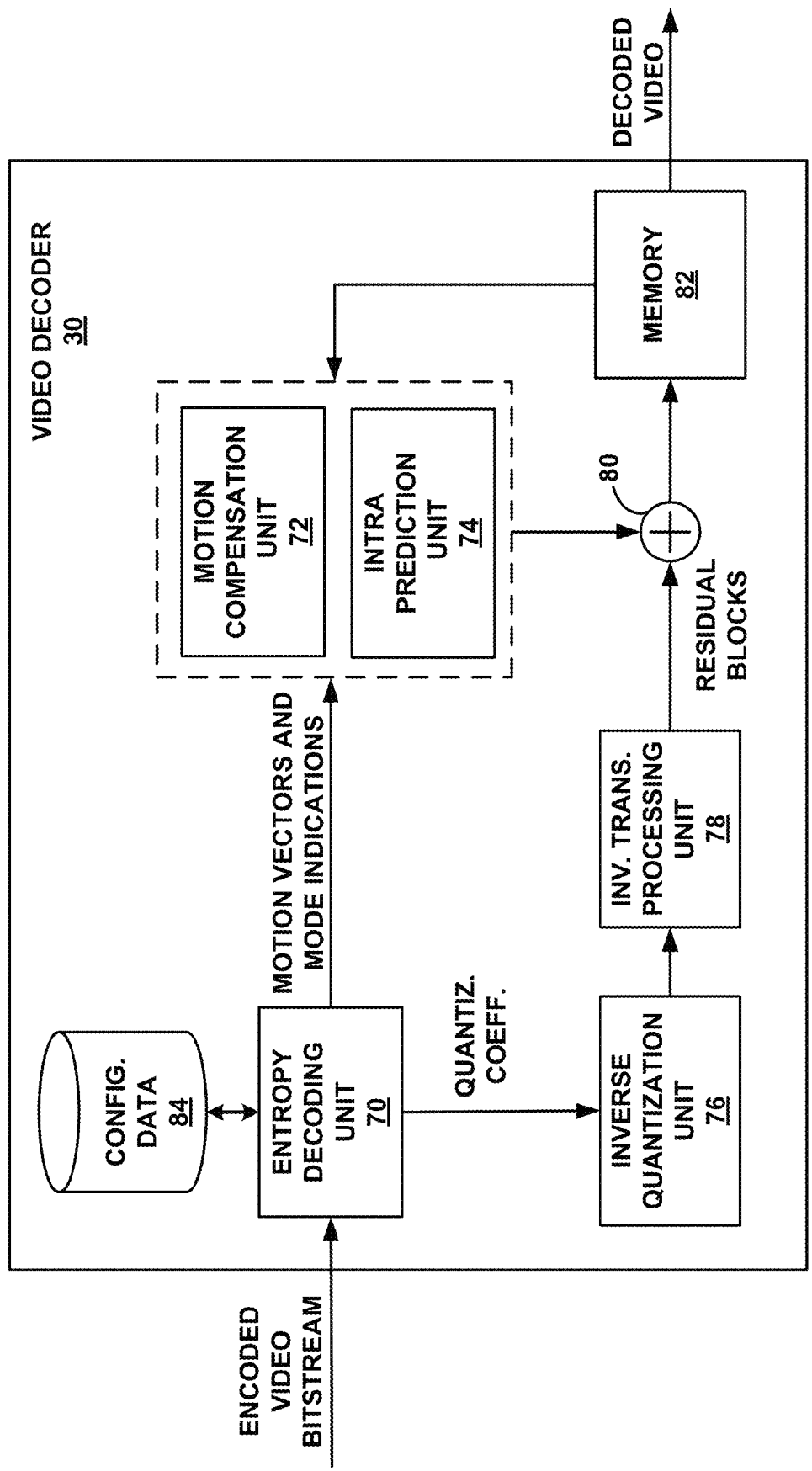
FIG. 6 is a block diagram illustrating an example of a video decoder, which decodes an encoded video sequence.

FIG. 6 is a block diagram illustrating an example of video decoder 30, which decodes an encoded video sequence. Video decoder 30 is an example of a video decoder configured to parse syntax elements conforming to Table 1, Table 2, and Table 3 above. In the example of FIG. 6, video decoder 30 includes an entropy decoding unit 70, motion compensation unit 72, intra-prediction unit 74, inverse quantization unit 76, inverse transformation unit 78, memory 82 and summer 80. Video decoder 30 may, in some examples, perform a decoding pass generally reciprocal to the encoding pass described with respect to video encoder 20 (FIG. 5). Motion compensation unit 72 may generate prediction data based on motion vectors received from entropy decoding unit 70.

Motion compensation unit 72 may use motion vectors received in the bitstream to identify a prediction block in reference frames in reference frame store 82. Intra-prediction unit 74 may use intra-prediction modes received in the bitstream to form a prediction block from spatially adjacent blocks.

Entropy decoding unit 70 may receive data representative of an intra-prediction mode to use to decode an encoded block of video data. Entropy decoding unit 70 may determine a context for the encoded block, e.g., based on intra-prediction modes for a left-neighboring and top-neighboring block to the encoded block and/or a size for the encoded block. Based on the context, entropy decoding unit 70 may determine one or more most probable intra-prediction modes to use to decode the block.

Intra-prediction unit 74 may use the indication of the intra-prediction mode to intra-predict the encoded block, e.g., using pixels of neighboring, previously decoded blocks. For examples in which the block is inter-prediction mode encoded, motion compensation unit 72 may receive information defining a motion vector, in order to retrieve motion compensated prediction data for the encoded block. In any case, motion compensation unit 72 or intra-prediction unit 74 may provide information defining a prediction block to summer 80.

Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard or as performed by the HEVC Test Model. The inverse quantization process may also include use of a quantization parameter $QP_Y$ calculated by encoder 20 for each macroblock to determine a degree of quantization and, likewise, a degree of inverse quantization that should be applied.

Inverse transform processing unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of blocks used to encode frame(s) of the encoded video sequence, partition information that describes how each block of a frame or slice of the encoded video sequence is partitioned, modes indicating how each partition is encoded, one or more reference frames (and reference frame lists) for each inter-encoded block or partition, and other information to decode the encoded video sequence.

Summer 80 sums the residual blocks with the corresponding prediction blocks generated by motion compensation unit 72 or intra-prediction unit 74 to form decoded blocks. If desired, a deblocking filter may also be applied to filter the decoded blocks in order to remove blockiness artifacts. The decoded video blocks are then stored in reference frame store 82, which provides reference blocks for subsequent motion compensation and also produces decoded video for presentation on a display device (such as display device 32 of FIG. 1).

In this manner, video decoder 30 can be configured to receive video data and parse PPS syntax of the video data to determine if a short slice header or a full slice header is present for a slice. The parsing may, for example, include determining a value for a flag identifying if short slice headers are enabled. In response to the short slice header being present, video decoder 30 can identify other slice header syntax elements and other slice header syntax structures from a full slice header, wherein the full slice header is associated with a slice that precedes the slice in a decoding order. The short slice header may include one or more of a slice starting address, a slice ID, a short slice header enabled flag, a slice boundary independence flag, a CABAC initialization parameter, and a slice QP. The slice boundary independence flag can signal whether in-picture prediction across slices for decoding is allowed.

Video decoder 30 can also be configured to receive video data and parse PPS syntax of the video data to determine if a slice boundary independence flag is present in a slice header for a slice. The parsing can include determining a value for a dependent slice enabled flag.

Video decoder 30 represents an example of a video encoder configured to parse syntax in accordance with Table 1, Table 2, and Table 3 above. For example, video decoder 30 represents an example of a video decoder configured to code a first instance of a first syntax element for a first picture. The first syntax element can be part of a PPS. The first value for the first syntax element can indicate in-picture prediction is allowed across slices for slices of the first picture. When in-picture prediction is allowed across slice boundaries, video decoder 30 can code a first coding unit of a first slice based on information of a second coding unit of a second slice. In response to the first syntax element indicating in-picture prediction is allowed across slices, video decoder 30 can code a second syntax element indicating in-picture prediction is allowed across slices. The second syntax element can be part of a slice header, and the presence of the second syntax element in the slice header can be dependent on the first value of the first syntax element. Video decoder 30 can also code a second instance of the first syntax element for a second picture. The second value for the first syntax element can indicate in-picture prediction is not allowed across slices for slices of the second picture.

The various decoding techniques described in reference to video decoder 30 may in some instances also be implemented by video encoder 20. For example, as part of a video encoding process, video encoder 20 may decode the encoded video.

Figure 7:
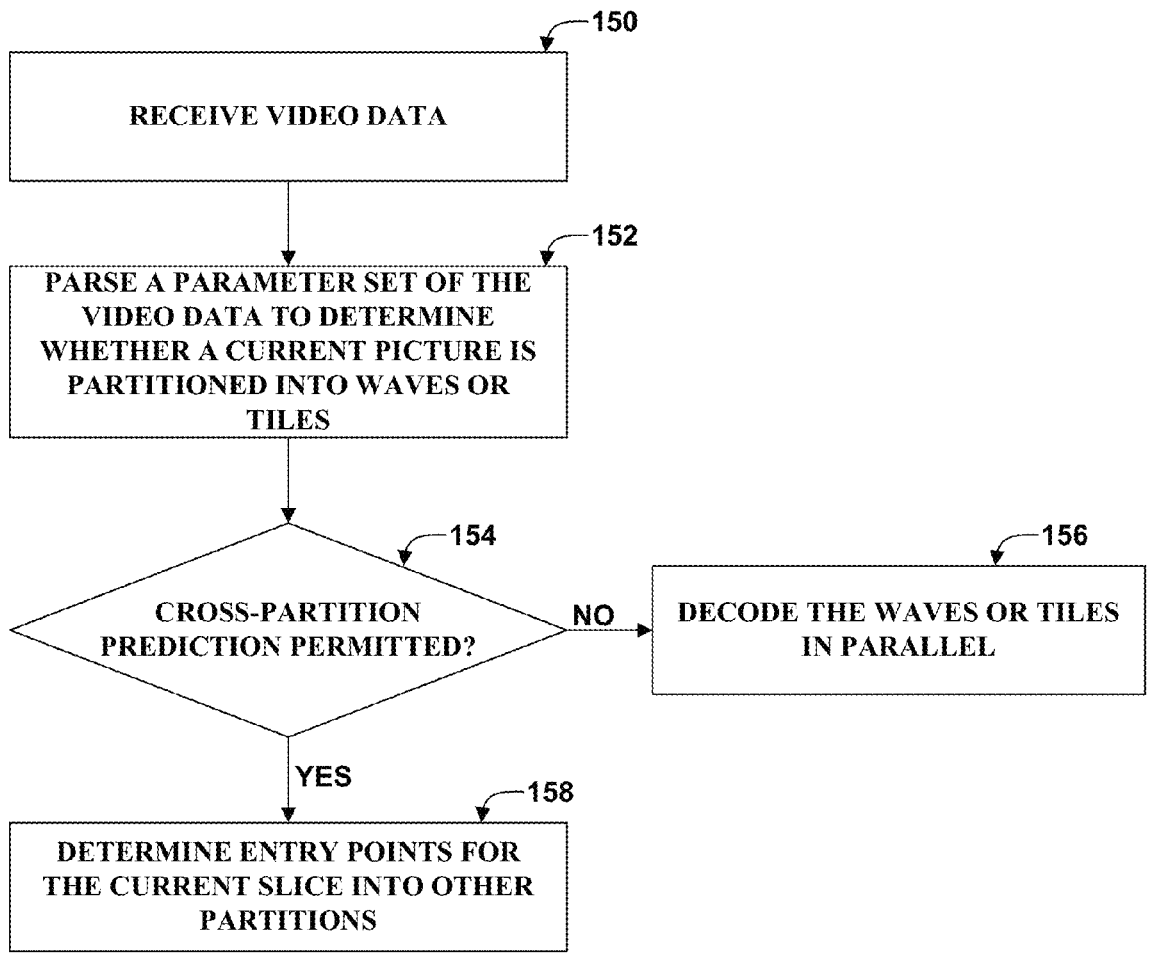
FIG. 7 is a flowchart depicting an example method according to the techniques described in this disclosure.

FIG. 7 is a flowchart illustrating an example method of decoding video data according to the techniques of this disclosure. For purposes of example, the method of FIG. 5 is described with respect to video decoder 30 of FIGS. 1 and 4 although the method may also be implemented by other types of video decoders.

Video decoder 30 can receive video data (150). In the received video data, video decoder 30 can parse a parameter set of the video data to determine whether a current picture is partitioned into waves or tiles (152). When the current picture is determined to be partitioned into waves or tiles, video decoder 30 can determine whether cross-partition prediction is permitted (154). If cross-partition prediction is not permitted (154, No), then video decoder 30 can decode the waves or tiles in parallel (156). If cross-partition prediction is permitted (154, Yes), then video decoder 30 can determine entry points for the current slice into other partitions (158).

Figure 8:
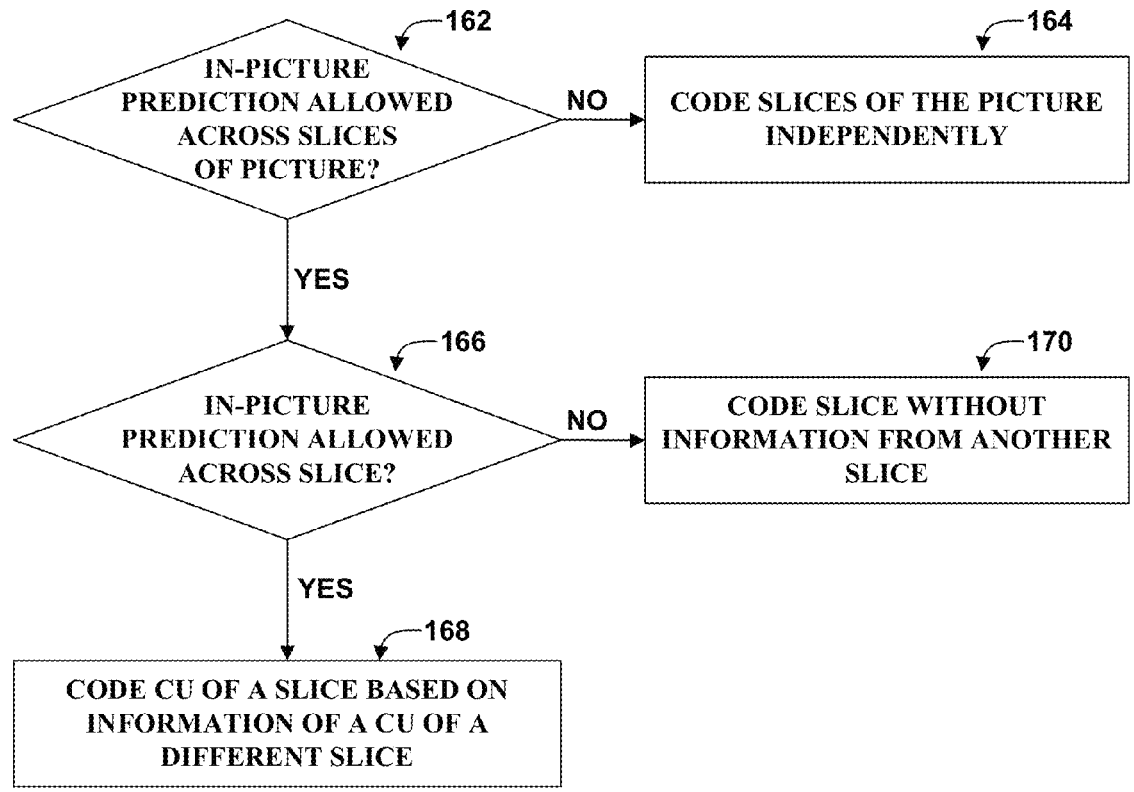
FIG. 8 is a flowchart depicting an example method according to the techniques described in this disclosure.

FIG. 8 is a flowchart illustrating an example method of coding video data according to the techniques of this disclosure. For purposes of example, the method of FIG. 5 is described with respect to a generic video coder. The generic video coder may, for example, be a video decoder such as video decoder 30 of FIGS. 1 and 4 or may be a video encoder such as video encoder 20 of FIGS. 1 and 3, although the method may also be implemented by other types of video coders.

The video coder determines if in-picture prediction is allowed across slices of a picture (162). As part of determining in-picture prediction is not allowed across slices of the picture, the video coder may code a syntax element. If the video coder is a video encoder, then coding the syntax element may include generating the syntax element and setting the syntax element to a value that indicates in-picture prediction is not allowed across slice boundaries in the pictures. If the video coder is a video decoder, then the video decoder may code the syntax element by parsing the syntax element and determining the syntax element is set to a value indicating that in-picture prediction is not allowed across slice boundaries of the pictures. The syntax element, whether generated by a video encoder or parsed by a video decoder, may be part of a PPS.

If in-picture prediction is not allowed across slices of a picture (162, No), then the video coder may, in some instances, code the slices of the picture independently (164). In a similar manner as above, as part of determining in-picture prediction is allowed across slices of the picture, the video coder may code a syntax element. If the video coder is a video encoder, then coding the syntax element may include generating the syntax element and setting the syntax element to a value that indicates in-picture prediction is allowed across slice boundaries in the pictures. If the video coder is a video decoder, then the video decoder may code the syntax element by parsing the syntax element and determining the syntax element is set to a value indicating that in-picture prediction is allowed across slice boundaries of the pictures. Thus, for a first instance of the syntax element (e.g. associated with a first picture), a first value may indicate in-picture prediction is allowed across slice boundaries, while for a second instance of the syntax element (e.g. associated with a second a picture), a second value of the syntax element may indicate in-picture prediction is not allowed across slice boundaries.

In instances where in-picture prediction is allowed across slice boundaries of a picture (162, Yes), the video coder can determine for a particular slice, if in-picture prediction is allowed across boundaries of that slice (166). As part of determining if in-picture prediction is allowed across boundaries of a particular slice, the video coder may code a second syntax element. If the video coder is a video encoder, then coding the second syntax element may include generating the second syntax element for inclusion in an encoded bitstream and setting the second syntax element to a value that indicates in-picture prediction is not allowed across boundaries of the slice or setting the second syntax element to a value that indicates in-picture prediction is allowed across boundaries of the slice. If the video coder is a video decoder, then the video decoder may code the second syntax element by parsing the second syntax element and determining the second syntax element is set to a value indicating that in-picture prediction is not allowed across boundaries of the slice or determining the second syntax element is set to a value indicating that in-picture prediction is allowed across boundaries of the slice. The second syntax element, whether generated by a video encoder or parsed by a video decoder, may be part of a slice header, and the presence of the second syntax element in the slice header may be dependent on the first syntax element in the PPS.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of coding video data, the method comprising:
coding, in a picture parameter set, a first syntax element for a first picture of the video data, wherein a first value for the first syntax element indicates that in-picture prediction is allowed across slices for slices of the first picture by indicating that syntax elements in headers for one or more slices of the first picture are allowed to be predicted from syntax elements in a header of a preceding slice of the first picture;
in response to the first syntax element indicating that in-picture prediction is allowed across slices, coding, in respective slice headers of slices in the first picture, a second syntax element indicating whether in-picture prediction is allowed across that slice by indicating whether syntax elements in a header of the respective slice are predicted from syntax elements in the header of the preceding slice, wherein presence of the second syntax element in the slice header is dependent on the first value of the first syntax element indicating that in-picture prediction is allowed across slices for slices of the first picture; and,
in response to the first syntax element indicating that in-picture prediction is allowed across slices and a respective second syntax element, for a first slice of the first picture, indicating that in-picture prediction is allowed across the first slice, coding a first coding unit of the first slice of the first picture of the video data based on information of a second coding unit of a second slice of the first picture of the video data.

2. The method of claim 1, further comprising:
coding a starting address for a slice of the video data, wherein the starting address for the slice is located before the second syntax element in the slice header.

3. The method of claim 1, wherein coding the first syntax element comprises coding a first instance of the first syntax element, the method further comprising:
coding a second instance of the first syntax element for a second picture, wherein a second value for the second instance of the first syntax element indicates that in-picture prediction is not allowed across slices for slices of the second picture.

4. The method of claim 3, further comprising:
coding the slices of the second picture independently.

5. The method of claim 1, wherein coding the first syntax element comprises encoding the first syntax element, wherein encoding the first syntax element comprises generating the first syntax element with the first value, and wherein coding the first coding unit comprises encoding the first coding unit.

6. The method of claim 1, wherein coding the first syntax element comprises decoding the first syntax element, wherein decoding the first syntax element comprises parsing the first syntax element to determine the first value, and wherein coding the first coding unit comprises decoding the first coding unit.

7. A device for coding video data, the device comprising:
a memory configured to store a first picture of the video data; and
a video coder configured to:
code, in a picture parameter set, a first syntax element for the first picture, wherein a first value for the first syntax element indicates that in-picture prediction is allowed across slices for slices of the first picture by indicating that syntax elements in headers for one or more slices of the first picture are allowed to be predicted from syntax elements in a header of a preceding slice of the first picture;
in response to the first syntax element indicating that in-picture prediction is allowed across slices, code, in respective slice headers of slices in the first picture, a second syntax element indicating whether in-picture prediction is allowed across that slice by indicating whether syntax elements in a header of the respective slice are predicted from syntax elements in the header of the preceding slice, wherein presence of the second syntax element in the slice header is dependent on the first value of the first syntax element indicating that in-picture prediction is allowed across slices for slices of the first picture; and,
in response to the first syntax element indicating that in-picture prediction is allowed across slices and a respective second syntax element, for a first slice of the first picture, indicating that in-picture prediction is allowed across the first slice, code a first coding unit of the first slice of the first picture of the video data based on information of a second coding unit of a second slice of the first picture of the video data.

8. The device of claim 7, wherein the video coder is further configured to:
code a starting address for a slice of the video data, wherein the starting address for the slice is located before the second syntax element in the slice header.

9. The device of claim 6, wherein, to code the first syntax element, the video coder codes a first instance of the first syntax element, and wherein the video coder is further configured to:
code a second instance of the first syntax element for a second picture, wherein a second value for the first syntax element indicates that in-picture prediction is not allowed across slices for slices of the second picture.

10. The device of claim 9, wherein the video coder is further configured to:
code the slices of the second picture independently.

11. The device of claim 7, wherein the video coder comprises a video encoder, wherein, to code the first syntax element, the video coder is further configured to generate the first syntax element with the first value, and wherein, to code the first coding unit, the video coder is configured to encode the first coding unit.

12. The device of claim 7, wherein the video coder comprises a video decoder, wherein, to code the first syntax element, the video coder is further configured to parse the first syntax element to determine the first value, and wherein, to code the first coding unit, the video coder is configured to decode the first coding unit.

13. The device of claim 7, wherein the device comprises at least one of:
an integrated circuit;
a microprocessor; and,
a wireless communications device that includes the video coder.

14. A device for coding video data, the device comprising:
means for coding, in a picture parameter set, a first syntax element for a first picture of the video data, wherein a first value for the first syntax element indicates that in-picture prediction is allowed across slices for slices of the first picture by indicating that syntax elements in headers for one or more slices of the first picture are allowed to be predicted from syntax elements in a header of a preceding slice of the first picture;
means for coding, in response to the first syntax element indicating that in-picture prediction is allowed across slices and in respective slice headers of slices in the first picture, a second syntax element indicating in-picture prediction is allowed across that slice by indicating whether syntax elements in a header of the respective slice are predicted from syntax elements in the header of the preceding slice, wherein presence of the second syntax element in the slice header is dependent on the first value of the first syntax element indicating that in-picture prediction is allowed across slices for slices of the first picture; and,
means for coding, in response to the first syntax element indicating that in-picture prediction is allowed across slices and a respective second syntax element, for a first slice of the first picture, indicating that in-picture prediction is allowed across the first slice, a first coding unit of the first slice of the first picture of the video data based on information of a second coding unit of a second slice of the first picture of the video data.

15. The device of claim 14, further comprising:
means for coding a starting address for a slice of the video data, wherein the starting address for the slice is located before the second syntax element in the slice header.

16. The device of claim 14, wherein the means for coding the first syntax element comprises means for coding a first instance of the first syntax element, the device further comprising:
means for coding a second instance of the first syntax element for a second picture, wherein a second value for the second instance of the first syntax element indicates in-picture prediction is not allowed across slices for slices of the second picture.

17. The device of claim 16, further comprising:
means for coding the slices of the second picture independently.

18. The device of claim 14, wherein the means for coding the first syntax element comprises means for encoding the first syntax element, wherein the means for encoding the first syntax element comprises means for generating the first syntax element with the first value, and wherein the means for coding the first coding unit comprise means for encoding the first coding unit.

19. The device of claim 14, wherein the means for coding the first syntax element comprises means for decoding the first syntax element, wherein the means for decoding the first syntax element comprises means for parsing the first syntax element to determine the first value, and wherein the means for coding the first coding unit comprise means for decoding the first coding unit.

20. A non-transitory computer-readable storage medium storing instructions that when executed cause one or more processors to:
code, in a picture parameter set, a first syntax element for a first picture of the video data, wherein a first value for the first syntax element indicates that in-picture prediction is allowed across slices for slices of the first picture by indicating that syntax elements in headers for one or more slices of the first picture are allowed to be predicted from syntax elements in a header of a preceding slice of the first picture;
in response to the first syntax element indicating that in-picture prediction is allowed across slices, code, in respective slice headers of slices in the first picture, a second syntax element indicating whether in-picture prediction is allowed across that slice by indicating whether syntax elements in a header of the respective slice are predicted from syntax elements in the header of the preceding slice, wherein presence of the second syntax element in the slice header is dependent on the first value of the first syntax element indicating that in-picture prediction is allowed across slices for slices of the first picture;
in response to the first syntax element indicating that in-picture prediction is allowed across slices and a respective second syntax element, for a first slice of the first picture, indicating that in-picture prediction is allowed across the first slice of the first picture of the video data, code a first coding unit of the first slice based on information of a second coding unit of a second slice of the first picture of the video data.

* * * * *